US009047764B2

(12) United States Patent
Fleury et al.

(10) Patent No.: US 9,047,764 B2
(45) Date of Patent: Jun. 2, 2015

(54) METHOD OF ALERT CALCULATION FOR AN AIRCRAFT GROUND PROXIMITY WARNING SYSTEM

(75) Inventors: Stéphane Fleury, Colomiers (FR); Laurent Flotte, Aurade (FR); Nicolas Marty, Saint Sauveur (FR); Erick Rakotoarisoa, Tournefeuille (FR)

(73) Assignee: Thales, Courbevoie (FR)

( * ) Notice: Subject to any disclaimer, the term of this patent is extended or adjusted under 35 U.S.C. 154(b) by 1001 days.

(21) Appl. No.: 12/900,747

(22) Filed: Oct. 8, 2010

(65) Prior Publication Data

US 2011/0251741 A1 Oct. 13, 2011

(30) Foreign Application Priority Data

Oct. 9, 2009 (FR) ..................................... 09 04846

(51) Int. Cl.
*G08B 23/00* (2006.01)
*G01C 5/00* (2006.01)
*G05D 1/00* (2006.01)
*G08G 5/00* (2006.01)

(52) U.S. Cl.
CPC ............ *G08G 5/0086* (2013.01); *G08G 5/0052* (2013.01)

(58) Field of Classification Search
CPC ........... G01C 23/00; G01S 13/86; G01S 1/02; G05D 1/0646; G08G 5/0021; G08G 5/0086
USPC .............................................................. 701/9
See application file for complete search history.

(56) References Cited

U.S. PATENT DOCUMENTS

| | | | | |
|---|---|---|---|---|
| 2,847,855 | A * | 8/1958 | Berger France B | 73/178 R |
| 4,301,420 | A * | 11/1981 | Sugawara | 330/126 |
| 5,450,345 | A | 9/1995 | Raymer et al. | |
| 7,433,781 | B2 | 10/2008 | Bitar et al. | |
| 2008/0172148 | A1 | 7/2008 | Isorce et al. | |
| 2009/0125236 | A1 | 5/2009 | Fontaine et al. | |

FOREIGN PATENT DOCUMENTS

| | | |
|---|---|---|
| DE | 19605218 | 4/1997 |
| EP | 1560096 | 8/2005 |
| FR | 2877721 | 5/2006 |
| FR | 2888955 | 1/2007 |
| FR | 2913781 | 9/2008 |

OTHER PUBLICATIONS

Zelenka et al., "Flight Test Development and Evaluation of a Kalman Filter State Estimator for Low-Altitude Flight," 2nd IEEE Conf on Control Applications, 1993, pgs. 783-790 (Sep. 13, 1993).

* cited by examiner

*Primary Examiner* — John Q Nguyen
*Assistant Examiner* — Kyung Kim
(74) *Attorney, Agent, or Firm* — Baker & Hostetler LLP

(57) ABSTRACT

The invention relates to a method of alert calculation for an aircraft obstruction proximity warning system including a step for detecting a hazardous flight situation capable of triggering an alert as a function of a data signal representing the change in height below the aircraft, including, prior to the step of detection, a step for converting the data signal representing the change in height as a function of information representative of the vertical profile of the obstructions below the aircraft.

6 Claims, 3 Drawing Sheets

| | | | |
|---|---|---|---|
| 3 | 5 | 5 | 3 |
| 4 | 1 | 1 | 4 |
| 3 | 2 | 2 | 3 |
| 5 | 5 | 5 | 5 |

METHOD OF ALERT CALCULATION FOR AN AIRCRAFT GROUND PROXIMITY WARNING SYSTEM

CROSS-REFERENCE TO RELATED APPLICATION

This application claims priority to foreign French patent application No. FR 09 04846, filed on Oct. 9, 2009, the disclosure of which is incorporated by reference in its entirety.

FIELD OF THE INVENTION

The present invention relates to the method of alert calculation for an aircraft ground proximity warning system.

BACKGROUND OF THE INVENTION

The object of ground proximity warning systems is to prevent aviation accidents in which an aircraft that is still operable crashes into the ground, accidents known in the technical literature under the acronym CFIT, "Controlled Flight Into Terrain".

The first ground proximity warning systems known under the acronym GPWS did not show threatening relief or obstacles on a map, since they only took into account the aircraft's flight conditions. This is where the alert functions are in so-called "reactive" mode. As they posed a problem of adjusting their sensitivity, calling for a compromise between being triggered in time on each real risk of collision with the ground and a minimum of false alarms, it was quickly sought to improve them by adding to the information taken into account, navigation data and relief maps extracted from onboard topographical databases or those accessible from the aircraft in flight. Hence it is that ground proximity warning systems called TAWS appeared (acronym for "Terrain Awareness Warning System) which in addition to the usual GPWS functions, fulfilled an additional function of predictive alerting of risks of collision with the relief or with ground obstacles consisting in alerting the crew of the aircraft when the short-term predictable path of the aircraft might meet the ground or an obstacle on the ground. This is where the alert functions are in so-called "predictive" mode.

One of the criteria that can be used to judge the quality of a TAWS lies in its nuisance level. A nuisance alert is one which is generated by the TAWS while the aircraft is in a situation such that the operational margins are respected.

Most nuisances observed during the use of a TAWS originate from the so-called "reactive" modes. More precisely, there is, for example, an alert detection mode that consists in comparing the aircraft's height-to-rate-of-descent combination with a chart. There is also a second alert detection mode that consists in comparing height and height variation. An alert is generated for each of these modes when the combination of the two input parameters is considered abnormal. These two modes are therefore based, amongst other things, on the use of a radar altimeter which measures the height separating the aircraft from the relief (or obstacle) located below it.

From the type of mission carried out (transporting casualties from one hospital to another, VIP transport, traffic monitoring, police mission), the helicopter is an aircraft that regularly flies around in an urban area. When flying over dwellings or building structures, the radar altimeter therefore regularly observes large variations in the aircraft's radio altitude over very brief periods of time. These abrupt variations may suffice to trigger a reactive alert while the operational margins are quite satisfactory. These alerts are therefore regarded as nuisances by the crew who may be tempted to deactivate the TAWS system, thus being deprived of the safety net offered by the function.

Reactive modes do not take into account the nature of the environment through which the aircraft is flying. Reactive alerts will be generated in the same way for speed and radio altitude conditions and for a given relief, whether the aircraft is in the middle of a densely populated area in terms of obstacles (e.g. New York City) or whether it is in the middle of a desert area (e.g. the Sahara). Moreover, reactive modes use the data from the aircraft's sensors directly. These are more or less filtered according to the carrier and the type of sensor. This filtering is generally the same for all the systems using the datum generated.

Patent document 0701796 is known, disclosing a method for reducing nuisance alerts for anti-collision with obstacles for predictive modes. This method consists in calculating a weighting coefficient of the duration of a protection envelope in front of the aircraft as a function of obstacle density.

SUMMARY OF THE INVENTION

The invention aims at reducing nuisance alerts from ground proximity warning systems when the aircraft is moving in an area with a high density of obstacles.

More precisely, the invention is a method of alert calculation for an aircraft obstruction proximity warning system, comprising a step of detecting a hazardous flight situation capable of triggering an alert as a function of a data signal representing the change in height below the aircraft, characterized in that it also comprises, prior to the step of detection, a step for converting the data signal, representing the change in height, as a function of information representative of the vertical profile of the obstructions below the aircraft.

Preferably, the conversion of the signal is carried out by a filtering function defined by at least two filtering parameters, a gain parameter and a cut-off frequency.

According to a first mode of parameter setting, the active filtering parameters are determined as a function of at least two pieces of information each representing a type of mission and defining different filtering parameters for each mission. A type of mission is often associated with a particular density of obstacles of a flight area.

According to a second mode of parameter setting, the active filtering parameters are determined as a function of at least two pieces of information each representing a density of obstacles.

According to a third mode of parameter setting, the active filtering parameters are determined as a function of a piece of information representing the density of obstacles below the aircraft.

According to a fourth mode of parameter setting, the active filtering parameters are determined as a function of a piece of information representing the average speed of the aircraft over a brief period preceding the instantaneous date.

According to any of the variants of the invention, when the aircraft is located within a volume of an obstacle as defined in the aircraft's obstacle database, the active filtering parameters are determined as a function of a piece of information representing a maximum density of obstacles.

The method according to the invention can be used to significantly reduce nuisance alerts by providing a conversion of the radio altitude signal according to the current flight situation. Thus, the crew can continue to operate at low height and in areas of high density of obstacles while maintaining a good level of confidence in the alerts generated by the ground proximity warning system.

BRIEF DESCRIPTION OF THE DRAWINGS

The invention will be better understood and other advantages will appear on reading the following description, given as a non-restrictive example and thanks to the accompanying figures amongst which.

DETAILED DESCRIPTION

The invention applies to onboard ground proximity warning systems in aircraft. These systems incorporate reactive modes which, by periodically comparing certain of the aircraft's current parameters (radio altitude, vertical speed, etc.) with different charts, determine whether the current situation of the aircraft is a normal situation or whether it is potentially dangerous. In the latter case, an alert, limited to an oral message, is generated for informing the crew. The system comprises calculation means for implementing a hazardous flight situation detection function using charts. According to the modes activated or used, these charts compare the radio altitude datum with, for example, the speed of the aircraft or the variation in radio altitude. When an alert is detected, the system triggers an oral and/or visual alert on the interface between the cockpit and the crew.

Figure 2:
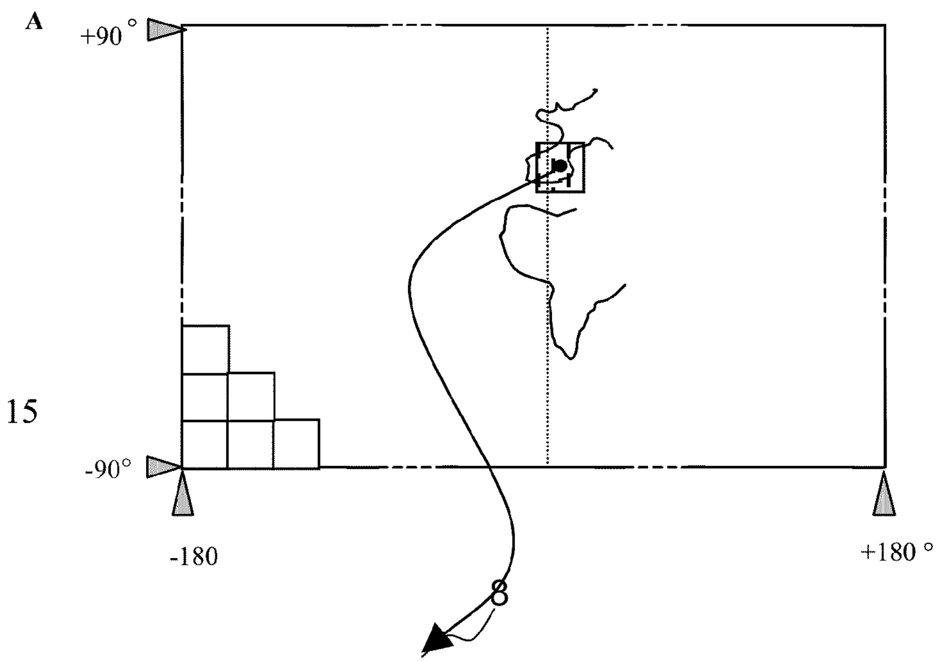
FIG. 2 represents an obstacle density database sample for a flight area.

For implementing the alert calculation functions, the system includes different types of input data interfaces. Amongst these data, the system includes an interface with the avionics systems for obtaining flight data information such as ground speed, vertical speed and radio altitude corresponding to the distance between the aircraft and the nearest element situated beneath the aircraft, i.e. the ground or where applicable an obstacle, the position of the aircraft, etc. The system also includes an interface for obtaining information representing the type of mission carried out. This information can be useful since the type of mission provides an indication of the flight situations which the aircraft will face. The information originates either from an input by the crew or it is determined automatically by a device from the aircraft's current flight parameters. In addition, the system may include an interface with a terrain and/or obstacle database. FIG. 2 illustrates a database sample 8 for a given flight area. This database contains the list of obstacles situated around the aircraft. It is subdivided into equal area regions. The area of these regions depends on the type of carrier envisaged. Each of these regions contains a figure from 1 to N indicating the average density of obstacles present in said region. There is an average separation distance d corresponding to each of these densities. The obstacle density databases provide information representative of the obstruction profile present in the flight area. Moreover, a particular vertical profile for obstacles often corresponds to a type of mission.

Figure 1:
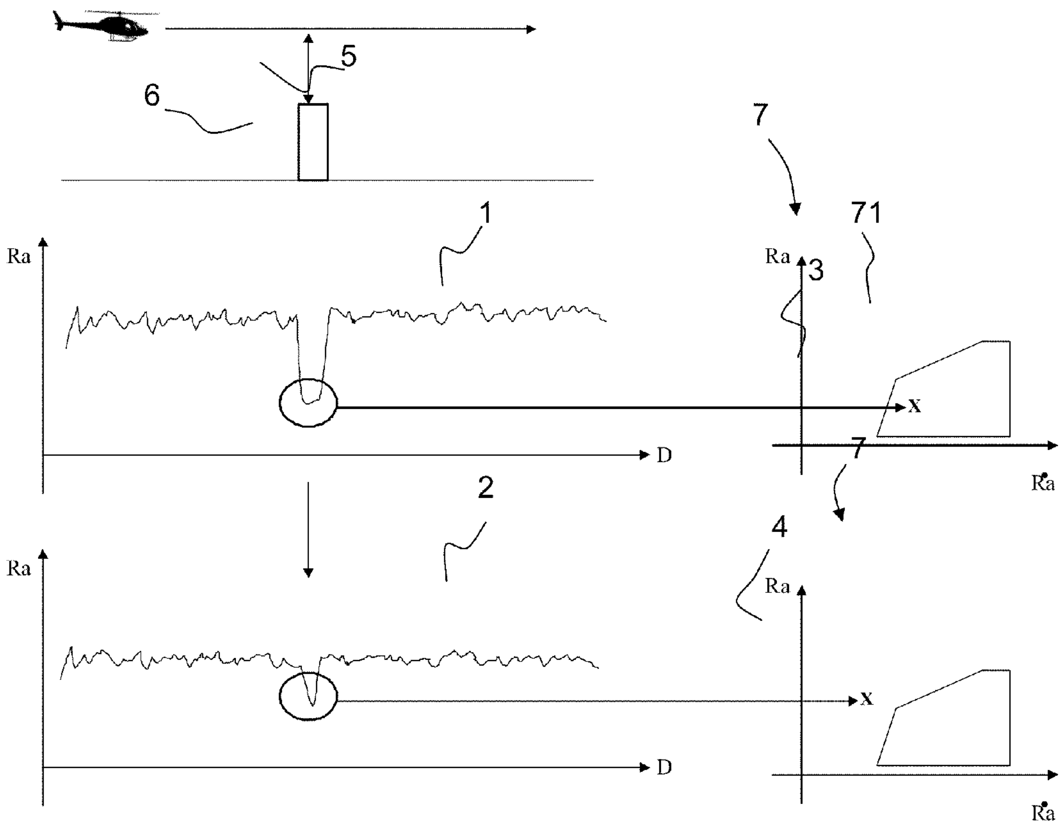
FIG. 1 represents two data signal curves representing the radio altitude during the passage of the aircraft above a building type obstacle. A first curve represents the signal without conversion according to the method and a second curve represents the signal after conversion according to the method.

Reactive modes of monitoring are based on the radio altitude datum. The method of alert calculation for the obstruction proximity warning system includes a first step for converting the data signal representing the change in height below the aircraft. This data signal represents radio altitude as a function of time during flight or also as a function of the distance traveled by the aircraft. FIG. 1 depicts a first radio altitude signal 1 upstream from the alert calculation method processing steps and a second radio altitude signal 2 downstream from the signal conversion step. The signal depicted corresponds to the change in radio altitude 5 during the part of a flight mission of an aircraft flying over an obstacle 6. During this part of the flight mission, the aircraft respects the operational flight margin and accordingly the flight situation does not present any risk. The warning system should not then have generated an alert for this flight situation. The calculation method includes a hazardous flight situation detection step performed, according to a first mode of detection, by means of a chart 7 comparing, for example, the radio altitude signal 1 Ra with the variation in this same radio altitude signal. This chart defines an area 71 in which the combination of the radio altitude signal and its derivative is considered abnormal or hazardous. Thus, if the hazardous flight situation detection function were performed on the raw radio altitude signal, i.e. on the signal before the signal conversion step, then the situation 3 included in the area 71 of abnormal situations would be detected by the alert calculation method and an alert would be generated. This situation would be similar to a nuisance since the operational margins are respected. Triggering the alert would be due to the sudden variation in radio altitude because of a building 6.

To avoid the occurrence of a nuisance alert, the method performs a step for converting the radio altitude signal 1 in order to transmit the radio altitude signal 2 for performing the hazardous flight situation detection function. This conversion step adapts the radio altitude signal to the specific features of the obstruction profile of the current flight area, notably for low altitude flight situations in urban areas characterized by the presence of obstacles 6 presenting quite a high ratio between the height and dimension of the base. Furthermore, the object of the signal conversion function is to reduce the influence of obstacles on the radio altitude signal. For this, a signal frequency filtering function is used to reduce the nuisances caused by these obstacles. According to the flight situation, the filtering function implemented is of the high-pass filter or averaging filter or band-pass filter type.

A frequency filter is defined by a gain parameter and one or two cut-off frequencies. For this, the method comprises a step for setting the parameters of the filter as a function of the flight situation in progress. More precisely, a flight situation is defined mainly by the density of the obstacles flown over in the flight area. Setting the parameters of the filtering function can be performed according to various embodiments depending on the degree of complexity and sophistication of the solution wanted.

In a first embodiment, the cut-off frequencies and gain of the filter are associated with a type of flight mission. For example, three levels of parameter setting may be cited, each of the levels being optimum for a given mission. A first level of parameter setting, for the gain parameter K1 and the cut-off frequency parameters F1 and F1', may be linked to an "Off-shore" mission dedicated to missions taking place around an oil platform. A second level of parameter setting, for the gain parameter K2 and the cut-off frequency parameters F2 and F2', may be linked to an "EMS" mission dedicated to rescue missions. A third level of parameter setting, for the gain parameter K3 and the cut-off frequency parameters F3 and F3', may be linked to a "Metropolitan" mission dedicated to urban area missions. Other parameter setting levels may be configured in the monitoring system, the invention not being restricted to the aforementioned levels.

In a second embodiment, the cut-off frequencies and gain of the filter are associated with a density of obstacles. A plurality of density levels is configured in the monitoring system and filtering parameters are thus associated with each of the parameter setting levels. A first level of parameter setting, for the gain parameter K1 and the cut-off frequency parameters F1 and F1', may be linked to a level 1 obstacle density. A second level of parameter setting, for the gain parameter K2 and the cut-off frequency parameters F2 and F2', may be linked to a level 2 obstacle density. A third level of parameter setting, for the gain parameter K3 and the cut-off frequency parameters F3 and F3', may be linked to a level 3 obstacle density. Other parameter setting levels may be configured in the monitoring system, the invention not being restricted to the aforementioned levels. According to the last two embodiments, the filtering parameters are associated with parameter setting levels preset in the system that can be selected by the crew.

In a third embodiment, the cut-off frequencies and gain of the filter are determined automatically in real time as a function of current flight parameters such as the speed of the aircraft and the current obstacle density. In particular, the gain is determined as a function of the density of obstacles in the current flight area. The gain may also be weighted according to the type of mission performed by the aircraft. The obstacle density considered is the highest obstacle density within a radius of less than a given distance. By adjusting the filtering on the highest frequency of occurrence of obstacles, the influence of more scattered obstacles will accordingly be reduced. As for the cut-off frequencies of the filter, they are calculated automatically in real time as a function of the obstacle density and the aircraft speed. For determining the cut-off frequencies, it is assumed that the obstacles associated with a density N are evenly spread over the flight area and on average a distance d apart from each other. The time interval separating two obstacles is therefore $t=d/Gs$ where Gs is the average ground speed of the aircraft over the last s seconds. The associated frequency is therefore equal to $1/t$. The different frequencies used correspond to $d+/-\sigma$, $d+/-2\sigma$, etc. Where $\sigma$ represents the standard deviation associated with the average distance d for density N.

Figure 3:
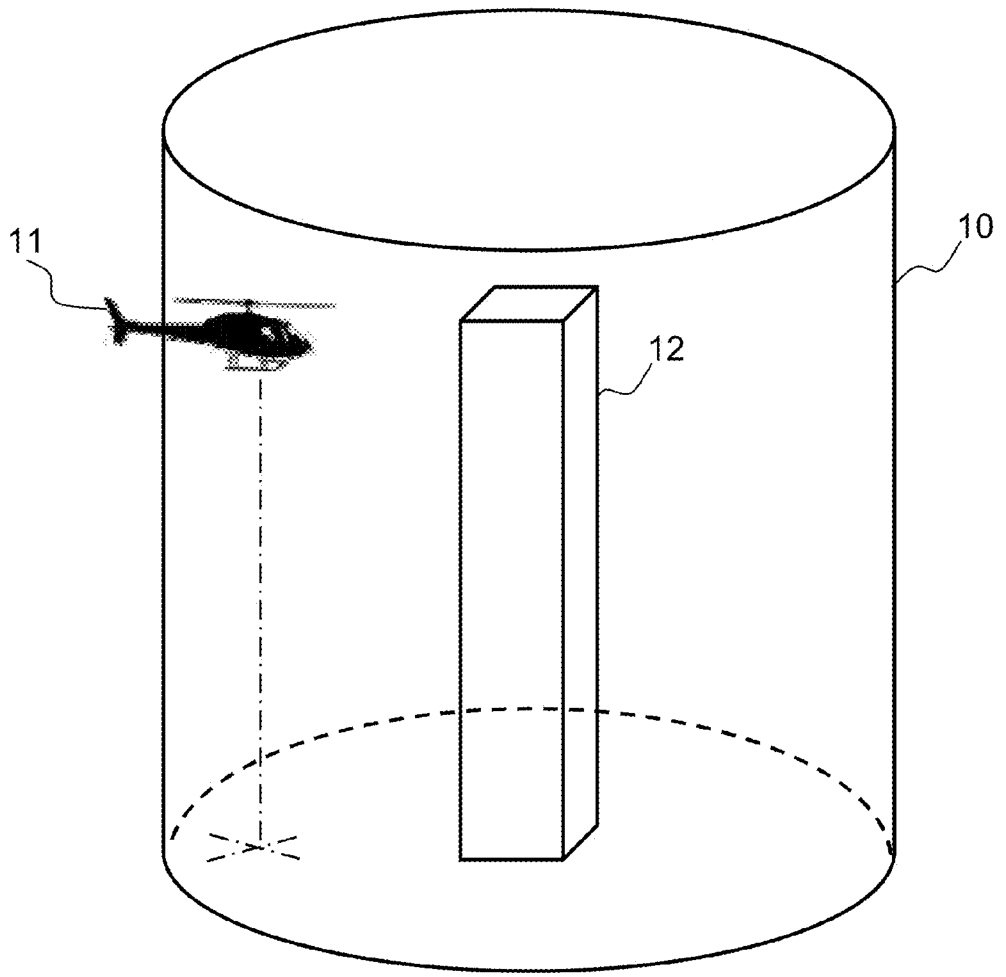
FIG. 3 represents a flight situation during which the aircraft is located in a volume corresponding to an obstacle as configured in the database.

FIG. 3 illustrates a flight situation during which the aircraft 11 is located in a volume 10 corresponding to an obstacle 12 as configured in the database. In this flight situation case, without conversion of the radio altitude signal alerts would be triggered but would be considered by the crew as being spurious alerts. This type of situation may occur since generally obstacles are defined in the databases by volumes greater than their actual dimensions. Accordingly, in the method according to the invention, the active filtering parameters are determined as a function of a piece of information representing a maximum obstacle density, i.e. the gain and cut-off frequency parameters are calculated according to the highest obstacle density value that it is possible to define in the obstacle densities databases. Thus, when the filtering parameters are calculated taking into account a maximum density, the resulting filtering reduces the impact of variation in the radio altitude signal to the maximum extent, thus preventing the triggering of spurious alerts originating from the reactive mode.

The functions setting the parameters of the filtering and the filtering step may be implemented by a computer built into the obstruction proximity warning system, i.e. the same computer performing the reactive and predictive alert calculation functions. In another hardware embodiment, the functions setting the parameters of the filtering and the filtering step may be implemented by a computer separate from the computer performing the reactive and predictive alert calculation functions. In the latter embodiment, this separate computer supplies the converted radio altitude signal to the alert computer.

What is claimed is:

1. A method of alert calculation for an aircraft obstruction proximity warning system comprising:

a step for detecting a hazardous flight situation capable of triggering an alert in a reactive mode, by analyzing a change of a current radio altitude signal measuring a distance between an aircraft and a nearest element situated beneath the aircraft, as a function of time during flight, and generating an alert when said change is considered abnormal, further comprising, prior to the step of detection, converting a first raw radio altitude signal into a second radio altitude signal which is used as an input signal by said step of detecting, said step of converting comprising frequency filtering of said first raw radio signal altitude in order to reduce an influence of obstacles on the radio altitude signal, said frequency filtering being defined by at least two filtering parameters: a gain parameter and a cut-off frequency, and said filtering parameters being calculated as a function of at least one parameter selected from the group consisting of type of aircraft mission, density of obstacles around the aircraft, and average speed of the aircraft over a brief period preceding an instantaneous time.

2. The method according to claim 1, wherein the filtering parameters are determined as a function of at least two pieces of information each representing a type of mission and defining different filtering parameters for each mission.

3. The method according to claim 1, wherein the filtering parameters are determined as a function of at least two pieces of information each representing an obstacle density.

4. The method according to claim 1, wherein the filtering parameters are determined as a function of a piece of information representing the density of obstacles below the aircraft.

5. The method according to claim 1, wherein the filtering parameters are determined as a function of a piece of information representing the average speed of the aircraft over a brief period preceding the instantaneous time.

6. The method according to claim 1, wherein, when the aircraft is located within a volume of an obstacle as defined in the aircraft's obstacle database, the filtering parameters are determined as a function of a piece of information representing a maximum density of obstacles.

* * * * *